(12) United States Patent
Ludwig et al.

(10) Patent No.: US 11,372,863 B2
(45) Date of Patent: Jun. 28, 2022

(54) RANKING FILTER OPERATION FOR CALCULATION SCENARIOS

(71) Applicant: SAP SE, Walldorf (DE)

(72) Inventors: Michael Ludwig, Leimen (DE); Johannes Merx, Heidelberg (DE); Christoph Weyerhaeuser, Leimen (DE); Julian Schwing, Heidelberg (DE)

(73) Assignee: SAP SE, Walldorf (DE)

( * ) Notice: Subject to any disclaimer, the term of this patent is extended or adjusted under 35 U.S.C. 154(b) by 223 days.

(21) Appl. No.: 16/711,141

(22) Filed: Dec. 11, 2019

(65) Prior Publication Data
US 2021/0182299 A1 Jun. 17, 2021

(51) Int. Cl.
*G06F 16/20* (2019.01)
*G06F 16/2457* (2019.01)
*G06F 16/27* (2019.01)
*G06F 16/21* (2019.01)

(52) U.S. Cl.
CPC ...... *G06F 16/24578* (2019.01); *G06F 16/212* (2019.01); *G06F 16/278* (2019.01)

(58) Field of Classification Search
CPC . G06F 16/24578; G06F 16/212; G06F 16/278
See application file for complete search history.

(56) References Cited

U.S. PATENT DOCUMENTS

| 7,111,020 | B1* | 9/2006 | Gupta | G06F 16/24539 |
|---|---|---|---|---|
| 2005/0065939 | A1* | 3/2005 | Miao | G06F 16/283 |
| 2008/0086479 | A1* | 4/2008 | Fry | H04L 67/1002 |
| 2014/0365465 | A1* | 12/2014 | Weyerhaeuser | G06F 16/283 707/714 |
| 2015/0120746 | A1* | 4/2015 | Mindnich | G06F 16/2264 707/741 |
| 2015/0142774 | A1* | 5/2015 | Mindnich | G06F 16/24544 707/714 |
| 2020/0175005 | A1* | 6/2020 | Viswanadha | G06F 16/244 |

* cited by examiner

*Primary Examiner* — Tarek Chbouki
(74) *Attorney, Agent, or Firm* — Mintz Levin Cohn Ferris Glovsky and Popeo, P.C.

(57) ABSTRACT

A calculation engine of a database management system is described. The calculation engine may receive a query associated with a calculation scenario that defines a data flow model. The data flow model may include one or more calculation nodes, each of which corresponding to an operation performed on one or more database tables stored at a database. The one or more calculation nodes may include at least one calculation node corresponding to a ranking filter operation. The calculation engine may execute the query including by executing the calculation scenario. The executing of the calculation scenario may include performing the ranking filter operation to generate a result corresponding to at least a portion of rows included in a first partition of a database table stored at the database. Related systems, methods, and articles of manufacture are provided.

16 Claims, 5 Drawing Sheets

RANKING FILTER OPERATION FOR CALCULATION SCENARIOS

TECHNICAL FIELD

The subject matter described herein relates generally to database processing and more specifically to a cloud-based analytics engine operating on data stored in a database.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for a calculation scenario including a ranking filter operation. In one aspect, there is provided a system. The system may include at least one data processor and at least one memory. The at least one memory may store instructions that result in operations when executed by the at least one data processor. The operations may include: receiving, at a calculation engine of a database management system, a query associated with a calculation scenario defining a data flow model that includes one or more calculation nodes, each of the one or more calculation nodes corresponding to an operation performed on one or more database tables stored at a database, and the one or more calculation nodes including a first calculation node corresponding to a ranking filter operation; and executing, by the calculation engine, the query including by executing the calculation scenario, the executing of the calculation scenario includes performing the ranking filter operation to generate a result corresponding to at least a portion of rows included in a first partition of a database table stored at the database.

In some variations, one or more features disclosed herein including the following features may optionally be included in any feasible combination. The ranking filter operation may be performed by at least aggregating and filtering a plurality of rows included in the first partition. The plurality of rows may be filtered by at least applying a filter to one or more rows starting at an offset from a first row the first partition or a last row in the first partition. The filter may be applied such that the result of the ranking filter operation corresponds to a specified quantity of rows.

In some variations, the filter may be applied such that the result of the ranking filter operation includes the specified quantity of rows in the first partition having a row number that does not exceed a threshold value or is in a threshold percentage of row numbers.

In some variations, the filter may be applied such that the result of the ranking filter operation includes the specified quantity of rows in the first partition having a rank not exceed a threshold value or is in a threshold percentage of ranks.

In some variations, the filter may be applied such that the result of the ranking filter operation includes an aggregate of values occupying the specified quantity of rows in the first partition having a row number that does not exceed a threshold value or is in a threshold percentage of row numbers. The aggregate may be a sum, an average, a minimum, a maximum, a medium, a count, a mode, or a range.

In some variations, a filter attribute that is not required at the first node may be pushed down. The filter attribute may be pushed down to a second calculation node that is lower in a hierarchy formed by the one or more calculation nodes than the first calculation node. The filter attribute may be pushed down to at least minimize a quantity of intermediate results at the first calculation node.

In some variations, the database table may be partitioned, based at least on a quantity of rows included in the database table, into the first partition and a second partition.

In some variations, the query may be received from an application server implementing a database client. The result of the calculation engine executing the query may be sent to the application server.

In another aspect, there is provided a method for a calculation scenario including a ranking filter operation. The method may include: receiving, at a calculation engine of a database management system, a query associated with a calculation scenario defining a data flow model that includes one or more calculation nodes, each of the one or more calculation nodes corresponding to an operation performed on one or more database tables stored at a database, and the one or more calculation nodes including a first calculation node corresponding to a ranking filter operation; and executing, by the calculation engine, the query including by executing the calculation scenario, the executing of the calculation scenario includes performing the ranking filter operation to generate a result corresponding to at least a portion of rows included in a first partition of a database table stored at the database.

In some variations, one or more features disclosed herein including the following features may optionally be included in any feasible combination. The ranking filter operation may be performed by at least aggregating and filtering a plurality of rows included in the first partition. The plurality of rows may be filtered by at least applying a filter to one or more rows starting at an offset from a first row the first partition or a last row in the first partition. The filter may be applied such that the result of the ranking filter operation corresponds to a specified quantity of rows.

In some variations, the filter may be applied such that the result of the ranking filter operation includes the specified quantity of rows in the first partition having a row number that does not exceed a threshold value or is in a threshold percentage of row numbers.

In some variations, the filter may be applied such that the result of the ranking filter operation includes the specified quantity of rows in the first partition having a rank not exceed a threshold value or is in a threshold percentage of ranks.

In some variations, the filter may be applied such that the result of the ranking filter operation includes an aggregate of values occupying the specified quantity of rows in the first partition having a row number that does not exceed a threshold value or is in a threshold percentage of row numbers. The aggregate may be a sum, an average, a minimum, a maximum, a medium, a count, a mode, or a range.

In some variations, the method may further include pushing down a filter attribute that is not required at the first node. The filter attribute may be pushed down to a second calculation node that is lower in a hierarchy formed by the one or more calculation nodes than the first calculation node. The filter attribute may be pushed down to at least minimize a quantity of intermediate results at the first calculation node.

In some variations, the method may further include partitioning, based at least on a quantity of rows included in the database table, the database table into the first partition and a second partition.

In another aspect, there is provided a computer program product that includes a non-transitory computer readable storage medium. The non-transitory computer-readable storage medium may include program code that causes operations when executed by at least one data processor. The operations may include: receiving, at a calculation engine of a database management system, a query associated with a calculation scenario defining a data flow model that includes one or more calculation nodes, each of the one or more calculation nodes corresponding to an operation performed on one or more database tables stored at a database, and the one or more calculation nodes including a first calculation node corresponding to a ranking filter operation; and executing, by the calculation engine, the query including by executing the calculation scenario, the executing of the calculation scenario includes performing the ranking filter operation to generate a result corresponding to at least a portion of rows included in a first partition of a database table stored at the database.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a ranking filter operation for calculation scenarios, it should be readily understood that such features are not intended to be limiting. The claims that follow this disclosure are intended to define the scope of the protected subject matter.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Data flow between an application server and a database server may be dependent on the scope and quantity of queries generated by the application server. Complex calculations may require executing numerous queries at the database server, which in turn may consume significant resources for transporting data to the application server and also processing the data at the application server. As such, in some example embodiments, a calculation engines may be deployed in order to perform complex calculations having numerous queries. For example, the calculation engine may be configured to execute calculation scenarios modeling complex queries. Instead of multiple individual queries, the calculation engine may execute a query invoking a calculation scenario. The calculation scenario may include a plurality of nodes, each of which corresponding to an operation performed on a database table. Moreover, the calculation scenario may be modeled in a generic manner including by exposing a selection of attributes that may be applied at each node in the calculation scenario. The query may thus invoke the calculation scenario by specifying one or more of the attributes.

In some example embodiments, the calculation scenario may include a calculation node corresponding to a ranking filter operation. The ranking filter operation may be performed on a partition of a database table to generate a result corresponding to at least a portion of the rows included in the partition. The result of the ranking filter operation may include at least some of the rows included in the partition having one or more attributes including, for example, a row number, a rank, and/or the like. For example, the ranking filter operation may be configured to generate a result including a top n quantity or a top n percentage of rows from the partition. That is, the result of the ranking filter operation may include rows whose row number does not exceed the value n or are in the top n percent of row numbers. Alternatively and/or additionally, the result of the ranking filter operation may include rows from the partition having a top n rank or a top n percentage rank. The result of the ranking filter operation may also include an aggregate (e.g., a sum, an average, a minimum, a maximum, a medium, a count, a mode, a range, and/or the like) of the values occupying a top n quantity or a top n percentage of rows from the partition.

Figure 1:
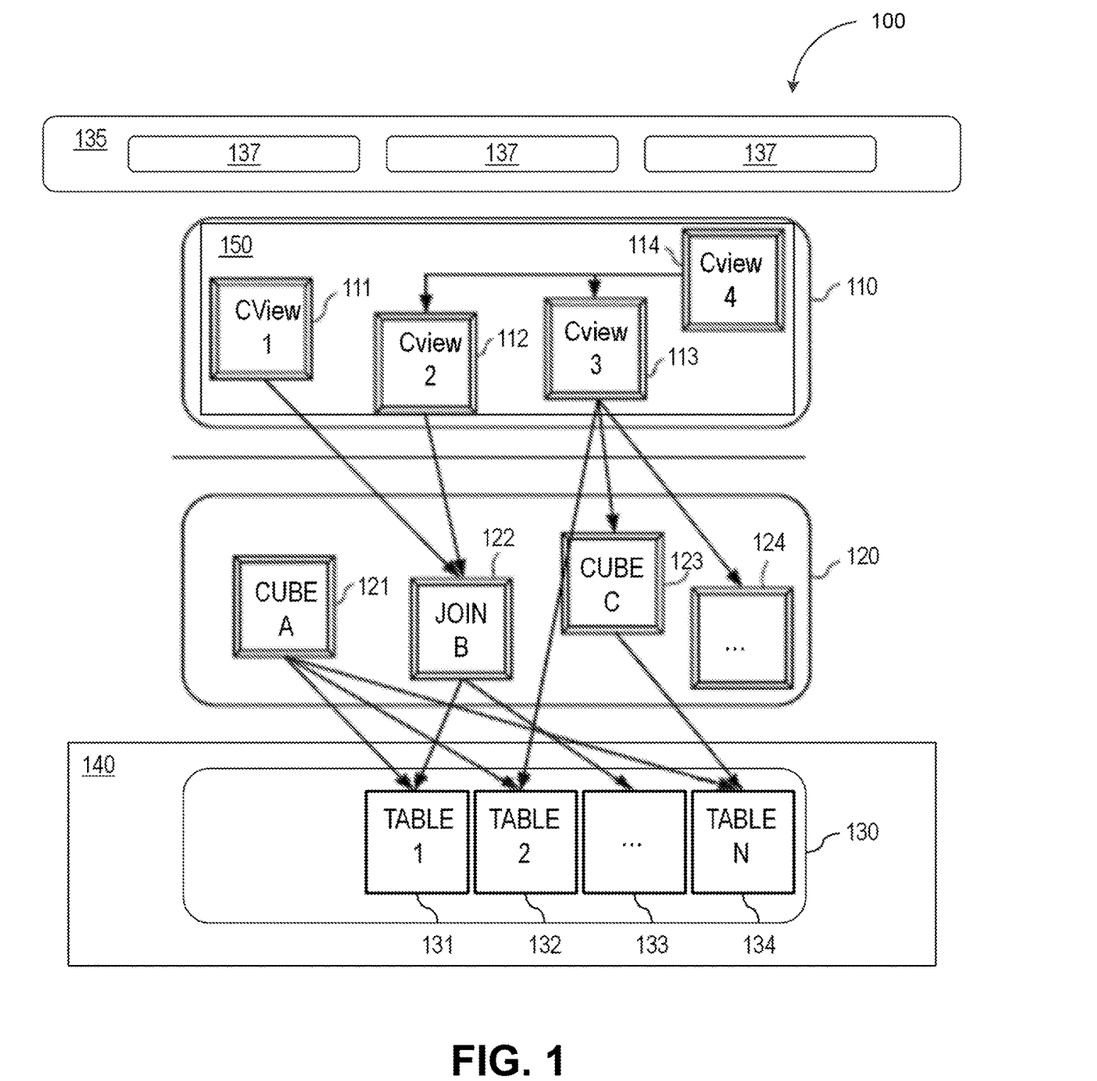
FIG. 1 depicts a block diagram illustrating an example of a database system, in accordance with some example embodiments.

FIG. 1 depicts a block diagram illustrating an example of a database system 100, in accordance with some example embodiments. Referring to FIG. 1, the database system 100 may include one or more layers including, for example, a calculation engine layer 110, a logical layer 120, and a physical table-pool 130. One or more application servers 135 implementing database client applications 137 may access the database system 100. Calculation scenarios may be executed by a calculation engine, which may form part of a database or which can be part of the calculation engine layer 110 (which is associated with the database). The calculation engine layer 110 can be based on and/or interact with the other two layers, the logical layer 120 and/or the physical table pool 130. The basis of the physical table pool 130 may include physical tables (called indexes) containing the data, which can be stored on one more database servers 140. Various tables 131-134 can be joined using logical metamodels 121-124 defined by the logical layer 120 to form an index. For example, the tables 131-134 in the illustrated CubeA metamodel 121 (e.g., an online analytical processing or "OLAP" index or other type of data structure) can be assigned roles (e.g., fact or dimension tables) and be joined to form a star schema or other type of schema. It is also possible to form join indexes (e.g. the $Join_B$ metamodel 122 in FIG. 1), which can act like database views in computing environments.

As stated above, a calculation scenario 150 can include individual nodes 111-114 (e.g., calculation views), which in turn each define operations such as a ranking filter operation, a join operation joining various physical or logical indexes, and other calculation views (e.g., the $CView_4$ node 114 is illustrated as a join of the $CView_2$ node 112 and the $CView_3$ node 113). That is, the input for a calculation node 111-114 can be one or more of a relational operation, a non-relational operation, or another node 111-114. Relational operations generally refer to operations that may be executed by a relational (e.g., SQL) engine. For example, joins, unions, aggregations, and/or the like are considered relational operations. On the other hand, non-relational operations can be operations that are not part of the standard relational engine's programming language (e.g., SQL standard) or may otherwise not be expressed in the programming language. For example, operations that can loop over intermediate results, scripted views/operators, procedural logic, currency conversion, multiproviders, and/or the like are considered non-relational operations.

In a calculation scenario 150 and/or calculation view node 111-114, two different representations can be provided including a pure calculation scenario in which all possible attributes are given and an instantiated model (also referred to herein as "optimized calculation scenario") that contains only the attributes requested in the query (and required for further calculations). Thus, calculation scenarios can be created that can be used for various queries. With such an arrangement, a calculation scenario 150 can be created which can be reused by multiple queries even if such queries do not require every attribute specified by the calculation scenario 150. Similarly, calculation views (e.g., nodes 111-114) may be created so that they may be reused in multiple calculation scenarios including, for example, the calculation scenario 150. This reusability can provide for simplified development of database queries.

Every calculation scenario 150 can be uniquely identifiable by a name (e.g., the calculation scenario 150 can be a database object with a unique identifier or some other indicia). Accordingly, the calculation scenario 150 can be queried in a manner similar to a view in a SQL database. Thus, the query is forwarded to the calculation node 111-114 for the calculation scenario 150 that is marked as the corresponding default node. In addition, a query can be executed on a particular calculation node 111-114 (as specified in the query). Furthermore, nested calculation scenarios can be generated in which one calculation scenario 150 is used as source in another calculation scenario (e.g. via a calculation node 111-114 in this calculation scenario 150). Each calculation node 111-114 can have one or more output tables. One output table can be consumed by several calculation nodes 111-114.

Figure 2:
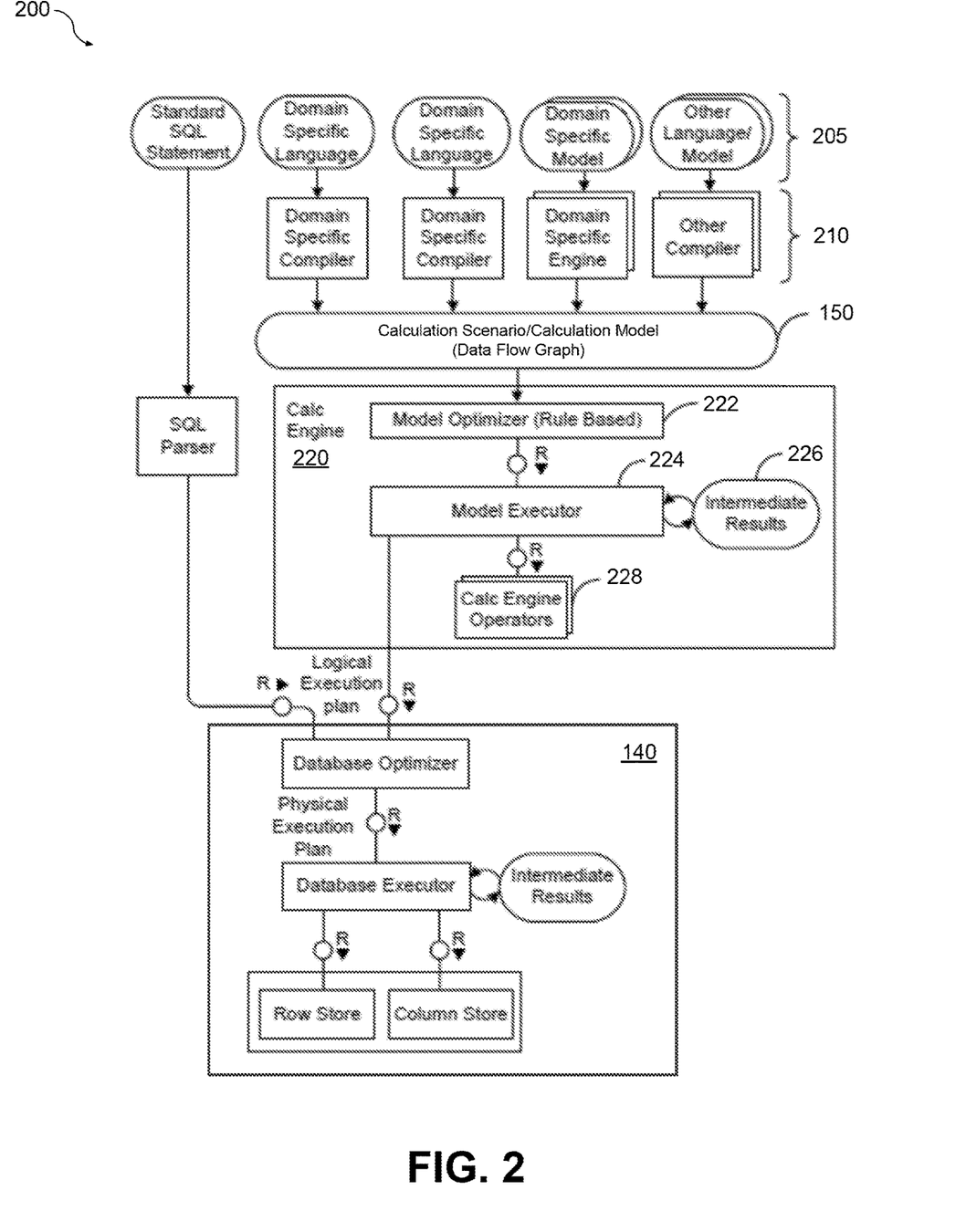
FIG. 2 depicts a functional block diagram illustrating an example architecture for request processing and execution control, in accordance with some example embodiments.

FIG. 2 depicts a functional block diagram illustrating an example architecture 200 for request processing and execution control, in accordance with some example embodiments. As shown in FIG. 2, artifacts 205 in different domain specific languages can be translated by their specific compilers 210 into a common representation called the calculation scenario 150 (which may also referred to as a calculation model). To achieve enhanced performance, the models and programs written in these languages can be executed inside the database server 140. This arrangement eliminates the need to transfer large amounts of data between the database server 140 and a client application 137, which may be executed by the application server 135. Once the different artifacts 205 are compiled into this calculation scenario 150, they can be processed and executed in the same manner. For example, a calculation engine 220 may optimize and/or execute the calculation scenario 150. At least a portion of the illustrated architecture 200 may be implemented as a database management system (e.g., not including the artifacts 205).

The calculation scenario 150 can be represented as a directed acyclic graph with arrows representing data flows and nodes that represent operations. Each node includes a set of inputs and outputs and an operation (or optionally multiple operations) that transforms the inputs into the outputs. In addition to their primary operation, each node may also include a filter condition for filtering the result set. The inputs and the outputs of the operations can be table valued parameters (i.e., user-defined table types that are passed into a procedure or function and that provide an efficient way to pass multiple rows of data to a client application 137 at the application server 135). Inputs can be connected to tables or to the outputs of other nodes. The calculation scenario 150 can support a variety of node types such as (i) nodes for set operations such as projection, aggregation, join, union, minus, intersection, and (ii) SQL nodes that execute a SQL statement which is an attribute of the calculation node. In addition, to enable parallel execution, the calculation scenario 150 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, they can use a split. Then, the calculation nodes can be automatically multiplied between split and merge and partition the data.

The calculation scenario 150 can be defined as part of database metadata and invoked multiple times. For example, the calculation scenario 150 can be created by a SQL statement "CREATE CALCULATION SCENARIO <NAME> USING <XML or JSON>". Once the calculation scenario 150 is created, it can be queried (e.g., "SELECT A, B, C FROM <scenario name>", etc.). In some cases, the calculation scenario 150 may be pre-defined (e.g., defaults, those previously defined by users, etc.). The predefined calculation scenario 150 can be persisted in a repository (coupled to the database server 140) or in transient scenarios. The predefined calculation scenario 150 can also be kept in-memory.

The calculation scenario 150 may be considered more powerful than traditional SQL queries or SQL views for many reasons. One reason is the possibility to define parameterized calculation schemas that are specialized when the actual query is issued. Unlike a SQL view, the calculation scenario 150 does not necessarily describe the actual query to be executed. Rather, it can describe the structure of the calculation. Further information can be supplied when the calculation scenario is executed. This further information may include parameters that represent values (for example in filter conditions). To provide additional flexibility, the operations can optionally also be refined upon invoking the calculation model. For example, at definition time, the calculation scenario 150 may contain an aggregation node containing all attributes. Later, the attributes for grouping can be supplied with the query. This allows having a predefined generic aggregation, with the actual aggregation dimensions supplied at invocation time. The calculation engine 220 can use the actual parameters, attribute list, grouping attributes, and the like supplied with the invocation to instantiate a query specific calculation scenario 150. This instantiated calculation scenario 150 is optimized for the actual query and does not contain attributes, nodes or data flows that are not needed for the specific invocation. For example, as described herein, the calculation scenario 150 can comprise a hierarchical join, which may be optimized by the calculation engine 220 prior to execution.

When the calculation engine 220 gets a request to execute the calculation scenario 150, it can first optimize the calculation scenario 150 using a rule based model optimizer 222. Examples for optimizations performed by the model optimizer 222 can include "push down" filters and projections so that intermediate results 226 are narrowed down earlier in compilation or execution, or the combination of multiple aggregation and join operations into one node. The optimized model can then be executed by a calculation engine model executor 224 (a similar or the same model executor can be used by the database directly in some cases). This can include decisions about parallel execution of operations in the calculation scenario 150. The model executor 224 can invoke the required operations (using, for example, a calculation engine operators module 228) and manage intermediate results 226. At least some of the calculation nodes and the corresponding operations can be executed directly in the calculation engine 220 (e.g., creating the union of several intermediate results 226). The remaining nodes of the calculation scenario 150 (not implemented in the calculation engine 220) can be transformed by the model executor 224 into a set of logical database execution plans. Multiple set operation nodes and the corresponding operations can be combined into one logical database execution plan if possible.

The model optimizer 222 can be configured to enable dynamic partitioning based on one or more aspects of a query and/or datasets used by queries. The model optimizer can implement a series of rules that are triggered based on attributes of incoming datasets exceeding specified thresholds. Such rules can, for example, apply thresholds each with a corresponding parallelization factor. For example, if the incoming dataset has 1 million rows then two partitions (e.g., parallel jobs, etc.) can be implemented, or if the incoming dataset has five million rows then five partitions (e.g., parallel jobs, etc.) can be implemented, and the like.

The attributes of the incoming datasets utilized by the rules of model optimizer 222 can additionally or alternatively be based on an estimated and/or actual amount of memory consumed by the dataset, a number of rows and/or columns in the dataset, and the number of cell values for the dataset, and the like.

The calculation scenario 150 as described herein can include a type of node referred to herein as a semantic node (or sometimes semantic root node). In some aspects, a database modeler can flag the root node (output) in a graphical calculation view to which the queries of the database applications are directed as semantic node. This arrangement allows the calculation engine 220 to easily identify those queries and to thereby provide a proper handling of the query in all cases.

The calculation scenario 150 used by the calculation engine 220 can be exposed as a special type of database view called a graphical calculation view. For example, relational (e.g., SQL) views may be stacked on top of the calculation scenario 150. Stacking in this manner may allow for a user to customize the front end of a program which utilizes the calculation scenario 150. A calculation view can be used in SQL queries and can be combined with tables and standard views using joins and sub queries. When such a query is executed, the database executor inside the SQL processor (not shown) needs to invoke the calculation engine 220 to execute the calculation scenario 150 behind the calculation view. In some implementations, the calculation engine 220 and the SQL processor are calling each other: on one hand the calculation engine 220 invokes the SQL processor for executing set operations and SQL nodes and, on the other hand, the SQL processor invokes the calculation engine 220 when executing SQL queries with calculation views.

In some example embodiments, the calculation scenario 150 may include a calculation node corresponding to a ranking filter operation. The calculation engine 220 may, in order to execute a query invoking the calculation scenario 150, may perform the ranking filter operation on a partition of a database table such as, for example, one or more of the tables 131-134 included in the physical table pool 130 shown in FIG. 1. The ranking filter operation may be an aggregation operation and a filter operation that the calculation engine 220 performs together, for example, one after another. The ranking filter operation may be performed to generate a result corresponding to at least a portion of the rows included the partition.

In some example embodiments, the result of the ranking filter operation may correspond to at least some of the rows included in the partition of the database table that have one or more attributes including, for example, a row number, a rank, and/or the like. For example, the ranking filter operation may be configured to generate a result including a top n quantity or a top n percentage of rows from the partition. That is, the result of the ranking filter may include rows whose row number does not exceed the value n or are in the top n percent of row numbers. Alternatively and/or additionally, the result of the ranking filter operation may include rows from the partition having a top n rank or a top n percentage rank. The result of the ranking filter operation may also include an aggregate (e.g., a sum, an average, a minimum, a maximum, a medium, a count, a mode, a range, and/or the like) of the values occupying a top n quantity or a top n percentage of rows from the partition.

Figure 3:
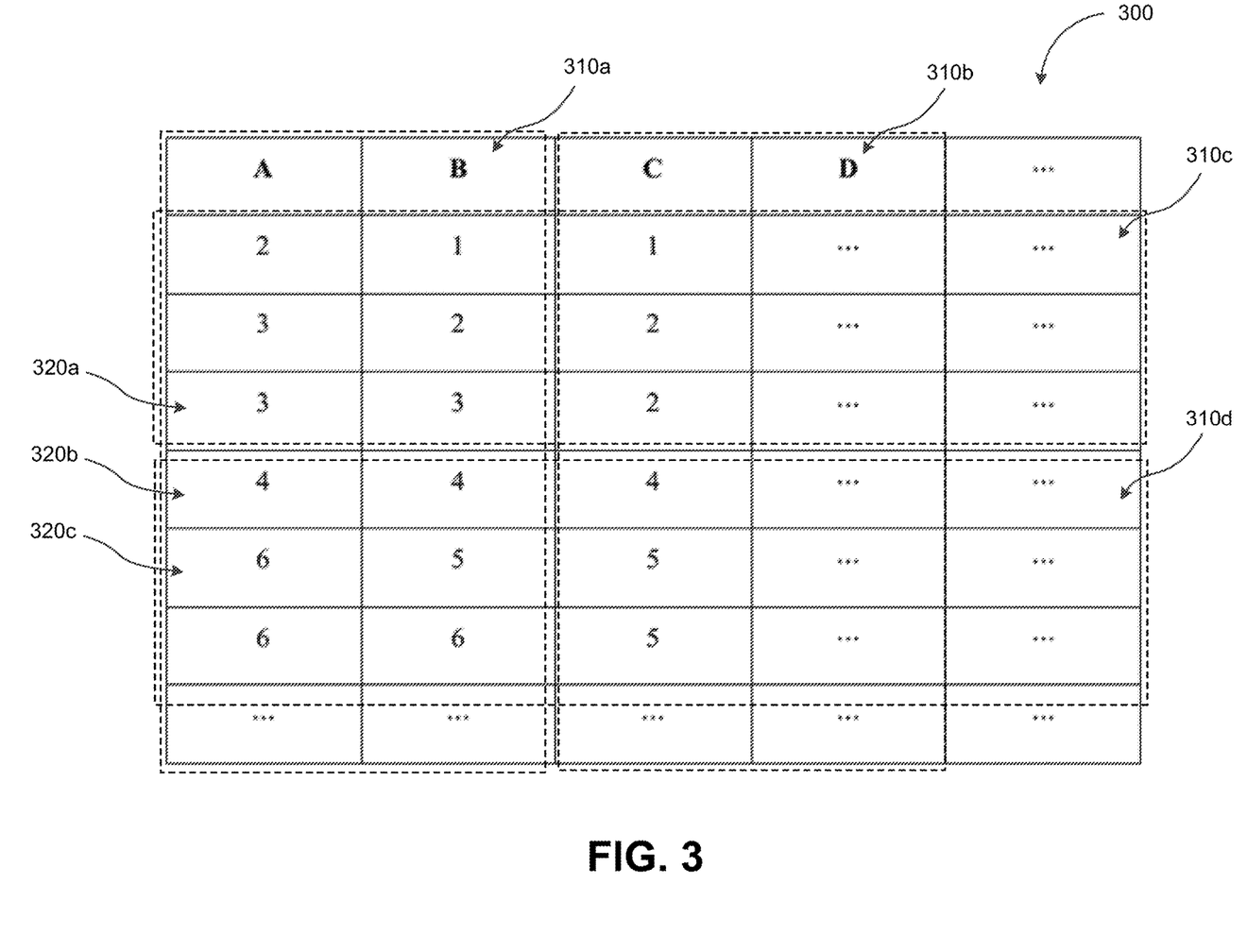
FIG. 3 depicts an example of a partition from a database table, in accordance with some example embodiments.

FIG. 3 depicts an example of a database table 300, in accordance with some example embodiments. The database table 300 may be a part of the physical table pool 130 stored at the one or more database servers 140. As shown in FIG. 3, the database table 300 may include at least one partition which may, in some example embodiments, be formed dynamically based on the quantity of rows in the database table 300. For example, the database table 300 may include one or more vertical partitions (e.g., a first partition 310a and a second partition 310b), each of which including some but not all of the columns included in the database table 300. Alternatively, the database table 300 may include one or more horizontal partitions (e.g., a third partition 310c and a fourth partition 310d), each of which including some but not all of the rows included in the database table 300.

In some example embodiments, the calculation engine 220 may execute a query invoking the calculation scenario 150 including by performing a ranking filter operation on the database table 300. The performance of the ranking filter operation may include filtering the data included in, for example, the first partition 310a of the database table 300, based on one or more attributes of the data such as a row number, a rank, and/or the like. Accordingly, the result of performing the ranking filter operation may include at least some of the rows included in the first partition 310a of the database table 300. For example, the result may include a top n quantity or a top n percentage of rows from the first partition 310a, which may correspond to rows having a row number that does not exceed the value n or is in the top n percent of row numbers. Alternatively and/or additionally, the result of the ranking filter operation may include rows from the first partition 310a having a top n rank or a top n percentage rank. The result of the ranking filter operation may also include an aggregate (e.g., a sum, an average, a minimum, a maximum, a medium, a count, a mode, a range, and/or the like) of the values occupying a top n quantity or a top n percentage of rows from the first partition 310a of the database table 300.

Referring again to FIG. 3, the database table 300, including the first partition 310a, may include an m quantity of rows. The calculation engine 220 performing the ranking filter operation may generate a result that corresponds to an n quantity of rows from the m quantity of rows included in the first partition 310a of the database table 300. As such, the performance of the ranking filter operation may include filtering the m quantity of rows to generate a result corresponding to the n quantity of rows.

In some example embodiments, the ranking filter operation may be defined to include one or more properties including, for example, function, partition attributes, order attributes, and filter definition. For example, the ranking filter operation may be defined as part of the calculation scenario 150. That is, the definition of the calculation scenario 150 may include a definition of the ranking filter operation. The ranking filter operation may be defined to support a variety of functions including, for example, ROW_NUMBER, RANK, DENSE_RANK, SUM, ROW_NUMBER_PERCENT, RANK_PERCENT, DENSE_RANK_PERCENT, SUM_PERCENT, and/or the like. The type of function that is applied during the performance of the ranking filter operation may be specified by the query invoking the calculation scenario 150. The query may specify the partition attributes, which may include one or more names of the columns from the database table 300 forming the first partition 310a operated upon by the ranking filter operation. Furthermore, the query may specify the order attributes indicating, for each column included in the first partition 310a, whether the rows are organized in an ascending order or a descending order.

In some example embodiments, the filter definition included in the definition of the ranking filter operation may define the filter that is applied to the data included in the first partition 310a. For example, the filter definition may include an offset, a quantity, and an offset reference. The offset included in the filter definition may indicate where (e.g., a row number or a quantity of rows) in the first partition 310a of the database table 300 to begin applying the filter. Meanwhile, the offset reference may indicate whether the offset should be determined from a start (e.g., a first row) of the first partition 310a or an end (e.g., a last row) of the first partition 310a. The quantity included in the filter definition may indicate a quantity of rows in the first partition 310a to which to apply the filter.

To further illustrate, the calculation engine 220 may apply the ranking filter operation to the first partition 310a of the database table 300 shown in FIG. 3. If the ranking filter operation is defined to apply the ROW_NUMBER function, the calculation engine 220 performing the ranking filter operation may generate a result that includes a top n quantity of rows from the first partition 310a, which may correspond to rows having a row number that does not exceed the value n. Alternatively, the ranking filter operation may be defined to apply the ROW_NUMBER_PERCENT function, in which case the calculation engine 220 performing the ranking filter operation may generate a result that includes a top n percentage of rows from the first partition 310a, which may correspond to rows that are in the top n percent of row numbers.

If the ranking filter operation is defined to apply RANK function, the calculation engine 220 performing the ranking filter operation may generate a result that includes rows from the first partition 310a having a top n rank. Meanwhile, if the ranking filter operation is defined to apply the RANK_PERCENT function, the calculation engine 220 performing the rank filter operation may generate a result that includes rows having a top n percentage rank.

In some example embodiments, the ranking filter operation may be defined to apply a DENSE_RANK function or a DENSE_RANK_PERCENT function. It should be appreciated that the DENSE_RANK function and the DENSE_RANK_PERCENT may assign a sequential rank to every row included in the first partition 310a, even when there are multiple rows assigned a same rank. Contrastingly, the RANK function and the RANK_PERCENT function may omit one or more subsequent ranks when multiple rows are assigned a same rank. For example, the data in Column A of the database table 300 shown in FIG. 3 may be ranked based on the numerical value occupying each row. Column B in the database table 300 depicts an example of dense ranks whereas Column C depicts an example of ranks. Accordingly, the calculation engine 220 performing the ranking filter operation defined to apply a DENSE_RANK function may generate a result that includes rows from the first partition 310a having a top n dense rank whereas the calculation engine 220 performing the ranking filter operation defined to apply the RANK_PERCENT function may generate a result that includes rows having a top n percentage dense rank.

In some example embodiments, the ranking filter operation may be defined to apply a SUM function in which case the calculation engine 220 performing the ranking filter operation may generate a result that includes a sum of the values occupying a top n quantity of rows included in the first partition 310a. Alternatively, if the ranking filter operation is defined to apply a SUM_PERCENT function, the calculation engine 220 performing the ranking filter operation may generate a result that includes a sum of the values occupying a top n percentage of rows in the first partition 310a. It should be appreciated that instead of and/or in addition to the SUM function and the SUM_PERCENT function, the ranking filter operation may be defined to apply a function configured to determine a different aggregate (e.g., an average, a minimum, a maximum, a medium, a count, a mode, a range, and/or the like) of the values occupying a top n quantity or a top n percentage of rows from the first partition 310a.

As noted, the definition of the ranking filter function may include a filter definition that includes an offset, a quantity, and an offset reference. To further illustrate, the calculation engine 220 may perform a ranking filter operation configured to apply a RANK function to the first partition 310a of the database table 300 shown in FIG. 3. The filter definition associated with the ranking filter function may include an offset of 2, a quantity of 3, and an offset reference FRONT. Based on this filter definition, the calculation engine 220 performing the corresponding ranking filter operation may generate a result that includes the rows 320a, 320b, and 320c from the first partition 310a.

Figure 4:
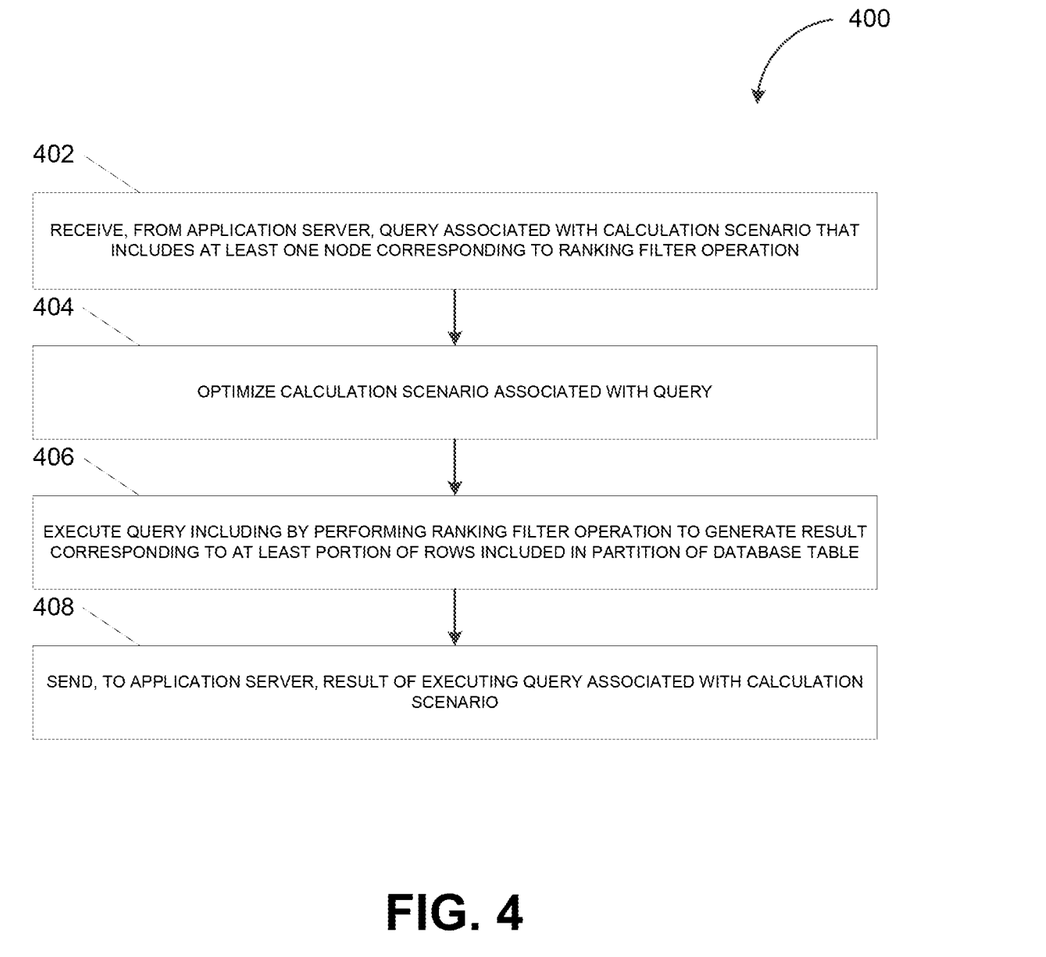
FIG. 4 depicts a flowchart illustrating a process for executing a query invoking a calculation scenario, in accordance with some example embodiments.

FIG. 4 depicts a flowchart illustrating a process 400 for executing a query invoking a calculation scenario, in accordance with some example embodiments. Referring to FIGS. 1-4, the process 400 may be performed by the calculation engine 220, for example, to execute a query that invokes the calculation scenario 150.

At 402, the calculation engine 220 may receive, from an application server, a query associated with a calculation scenario that includes at least one node corresponding to a ranking filter function. For example, the calculation engine 220 may receive, from the one or more application servers 135 implementing database client applications 137, a query. The query may invoke the calculation scenario 150 including the individual nodes 111-114 (e.g., calculation views), each of which defining one or more operations. In some example embodiments, the calculation scenario 150 may include at least one node that defines a ranking filter operation configured to generate a result that corresponds to at least a portion of the rows included in a partition of a database table such as, for example, the first partition 310a of the database table 300 shown in FIG. 3.

At 404, the calculation engine 220 may optimize the calculation scenario associated with the query. For example, the calculation engine 220 may optimize the calculation scenario 150 using the rule based model optimizer 222. An example of the optimizations that may be performed by the model optimizer 222 include pushing down filters and/or projections to minimize the intermediate results 226 of the calculation scenario 150. For instance, the calculation engine 220 may optimize the calculation scenario 150 by at least pushing down the filter associated with the ranking filter operation to a lowest possible node in the calculation scenario 150 if an attribute associated with the filter is not required at the calculation node. Pushing down the filter may further include removing the filter attribute as a join attribute for joining one or more tables at the calculation node. Other optimizations that may be performed by the model optimizer 222 may include combining, into a single node, multiple nodes corresponding to aggregation operations and/or join operations.

At 406, the calculation engine 220 may execute the query including by performing the ranking filter function to generate a result corresponding to at least a portion of rows included in a partition of a database table. For example, once optimized, the calculation engine 220 may use the calculation engine model executor 224 to execute the calculation scenario 150. The executing of the calculation scenario 150 may include determining whether one or more operations included in the calculation scenario 150 may be executed in parallel. Moreover, the model executor 224 may execute the calculation scenario 150 by at least invoking the required operations (using, for example, the calculation engine operators module 228) and manage the intermediate results 226. As noted, at least some of the calculation nodes of the calculation scenario 150 the operations may be executed locally at the calculation engine 220 (e.g., creating the union of several intermediate results 226). The calculation nodes of the calculation scenario 150 corresponding to operations not implemented in the calculation engine 220 may be transformed, for example, by the model executor 224, into a set of logical database execution plans for execution at the database servers 140.

In some example embodiments, the calculation scenario 150 may include at least one node corresponding to a ranking filter operation. The ranking filter operation may be configured to apply a variety of functions including, for example, ROW_NUMBER, RANK, DENSE_RANK, SUM, ROW_NUMBER_PERCENT, RANK_PERCENT, DENSE_RANK_PERCENT, SUM_PERCENT, and/or the like. Accordingly, as part of executing the calculation scenario 150, the calculation engine 220 may perform the ranking filter operation and generate a result corresponding to at least some of the rows included in a partition of a database table such as, for example, the first partition 310a of the database table 300 shown in FIG. 3.

At 408, the calculation engine 220 may send, to the application server, a result of executing the query associated with the calculation scenario. For example, the calculation engine 220 may send, to the one or more application servers 135, a result of executing the query associated with the calculation scenario 150. The result of executing the query may be determined based at least on a result of performing the ranking filter operation. According to some example embodiments, the result of performing the ranking filter operation may include a top n quantity or a top n percentage of rows from the first partition 310a, which may correspond to rows having a row number that does not exceed the value n or is in the top n percent of row numbers. Alternatively and/or additionally, the result of the ranking filter operation may include rows from the first partition 310a having a top n rank or a top n percentage rank. The result of the ranking filter operation may also include an aggregate (e.g., a sum, an average, a minimum, a maximum, a medium, a count, a mode, a range, and/or the like) of the values occupying a top n quantity or a top n percentage of rows from the first partition 310a of the database table 300.

Figure 5:
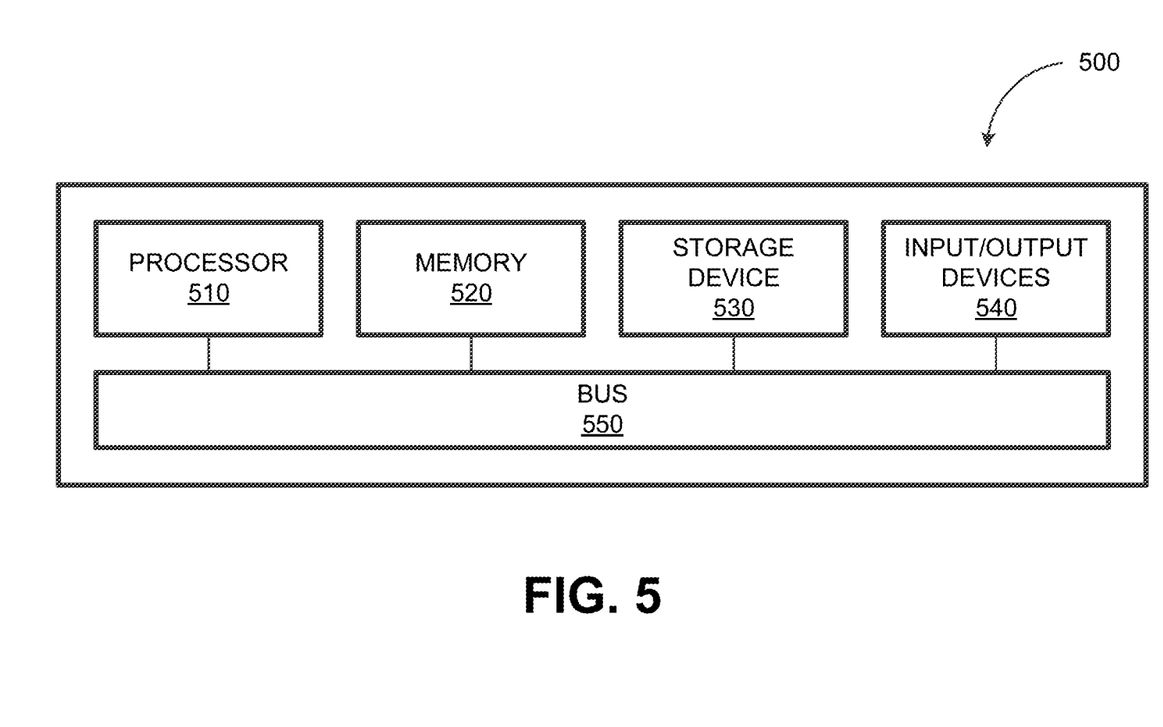
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the calculation engine 220 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the calculation engine 220. In some example embodiments, the processor 510 can be a single-threaded processor. Alternately, the processor 510 can be a multithreaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

Without in any way limiting the scope, interpretation, or application of the claims appearing below, a technical effect of one or more of the example embodiments disclosed herein is more efficient execution of complex calculation scenarios while allowing a developer to develop less complex software. For example, new software for databases may be deployed on top of currently existing software while still maintaining some of the benefits of the existing software and gaining additional benefits from the new software. Another technical effect can be that complex databases queries may be simplified for execution, providing for faster execution of complex calculation scenarios while allowing developers the freedom to develop such complex calculations scenarios.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, for, acoustic, speech, tactile, and/or the like. Other possible input devices may include, for example, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together."

A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions, which when executed by the at least one data processor, result in operations comprising:
        receiving, at a calculation engine of a database management system, a query associated with a calculation scenario defining a data flow model that includes one or more calculation nodes, each of the one or more calculation nodes corresponding to an operation performed on one or more database tables stored at a database, the one or more calculation nodes including a first calculation node corresponding to a ranking filter operation, and the query specifying an offset, a quantity of rows, and an offset reference associated with the ranking filter operation; and
        executing, by the calculation engine, the query including by executing the calculation scenario, the executing of the calculation scenario includes performing the ranking filter operation to generate a result corresponding to at least a portion of rows included in a first partition of a database table stored at the database, the plurality of rows being filtered by at least applying a filter to at least the portion of rows included in the first partition of the database table, the applying of the filter starting at the specified offset from a first row or a last row of the first partition in accordance with the specified offset reference, and the filter being applied such that the specified quantity of rows comprising the result of the ranking filter operation includes one or more rows whose rank does not exceed a threshold value or is in a threshold percentage of ranks.

2. The system of claim 1, wherein the ranking filter operation is performed by at least aggregating and filtering a plurality of rows included in the first partition.

3. The system of claim 1, wherein the filter is applied such that the specified quantity of rows comprising the result of the ranking filter operation includes one or more rows whose row number does not exceed a threshold value or is in a threshold percentage of row numbers.

4. The system of claim 1, wherein the filter is applied such that the result of the ranking filter operation includes an aggregate of values occupying the specified quantity of rows in the first partition having a row number that does not exceed a threshold value or is in a threshold percentage of row numbers.

5. The system of claim 4, wherein the aggregate comprises a sum, an average, a minimum, a maximum, a medium, a count, a mode, or a range.

6. The system of claim 1, further comprising:
    pushing down a filter attribute that is not required at the first node, the filter attribute being pushed down to a second calculation node that is lower in a hierarchy formed by the one or more calculation nodes than the first calculation node, and the filter attribute being pushed down to at least minimize a quantity of intermediate results at the first calculation node.

7. The system of claim 1, further comprising:
    partitioning, based at least on a quantity of rows included in the database table, the database table into the first partition and a second partition.

8. The system of claim 1, wherein the query is received from an application server implementing a database client, and wherein the result of the calculation engine executing the query is sent to the application server.

9. A computer-implemented method, comprising:
    receiving, at a calculation engine of a database management system, a query associated with a calculation scenario defining a data flow model that includes one or more calculation nodes, each of the one or more calculation nodes corresponding to an operation performed on one or more database tables stored at a database, the one or more calculation nodes including a first calculation node corresponding to a ranking filter operation, and the query specifying an offset, a quantity of rows, and an offset reference associated with the ranking filter operation; and
    executing, by the calculation engine, the query including by executing the calculation scenario, the executing of the calculation scenario includes performing the ranking filter operation to generate a result corresponding to at least a portion of rows included in a first partition of a database table stored at the database, the plurality of rows being filtered by at least applying a filter to at least the portion of rows included in the first partition of the database table, the applying of the filter starting at the specified offset from a first row or a last row of the first partition in accordance with the specified offset reference, and the filter being applied such that the specified quantity of rows comprising the result of the ranking filter operation includes one or more rows whose rank does not exceed a threshold value or is in a threshold percentage of ranks.

10. The computer-implemented method of claim 9, wherein the ranking filter operation is performed by at least aggregating and filtering a plurality of rows included in the first partition.

11. The computer-implemented method of claim 9, wherein the filter is applied such that the specified quantity of rows comprising the result of the ranking filter operation includes one or more rows whose row number does not exceed a threshold value or is in a threshold percentage of row numbers.

12. The computer-implemented method of claim 9, wherein the filter is applied such that the result of the ranking filter operation includes an aggregate of values occupying the specified quantity of rows in the first partition having a row number that does not exceed a threshold value or is in a threshold percentage of row numbers.

13. The computer-implemented method of claim 12, wherein the aggregate comprises a sum, an average, a minimum, a maximum, a medium, a count, a mode, or a range.

14. The computer-implemented method of claim 9, further comprising:
pushing down a filter attribute that is not required at the first node, the filter attribute being pushed down to a second calculation node that is lower in a hierarchy formed by the one or more calculation nodes than the first calculation node, and the filter attribute being pushed down to at least minimize a quantity of intermediate results at the first calculation node.

15. The computer-implemented method of claim 9, further comprising:
partitioning, based at least on a quantity of rows included in the database table, the database table into the first partition and a second partition.

16. A non-transitory computer readable medium storing instructions, which when executed by at least one data processor, result in operations comprising:
receiving, at a calculation engine of a database management system, a query associated with a calculation scenario defining a data flow model that includes one or more calculation nodes, each of the one or more calculation nodes corresponding to an operation performed on one or more database tables stored at a database, the one or more calculation nodes including a first calculation node corresponding to a ranking filter operation, and the query specifying an offset, a quantity of rows, and an offset reference associated with the ranking filter operation; and
executing, by the calculation engine, the query including by executing the calculation scenario, the executing of the calculation scenario includes performing the ranking filter operation to generate a result corresponding to at least a portion of rows included in a first partition of a database table stored at the database, the plurality of rows being filtered by at least applying a filter to at least the portion of rows included in the first partition of the database table, the applying of the filter starting at the specified offset from a first row or a last row of the first partition in accordance with the specified offset reference, and the filter being applied such that the specified quantity of rows comprising the result of the ranking filter operation includes one or more rows whose rank does not exceed a threshold value or is in a threshold percentage of ranks.

* * * * *